No. 690,287. Patented Dec. 31, 1901.
C. HIRD.
CUSHION TIRE.
(Application filed Sept. 20, 1901.)
(No Model.) 2 Sheets—Sheet 1.
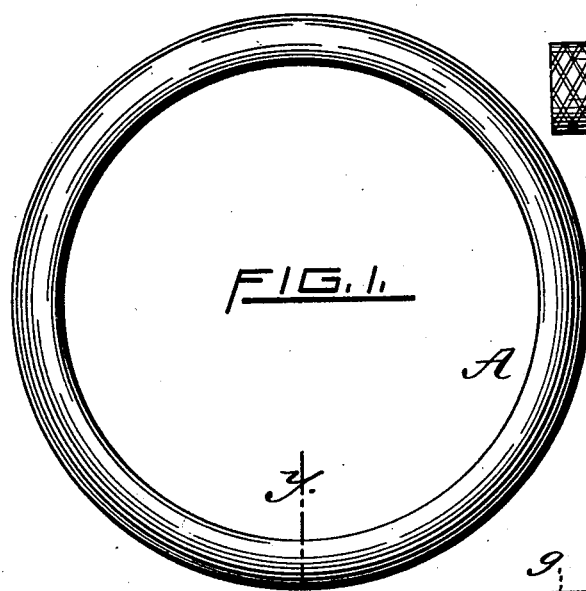
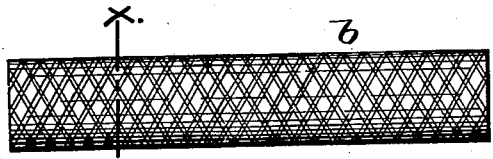
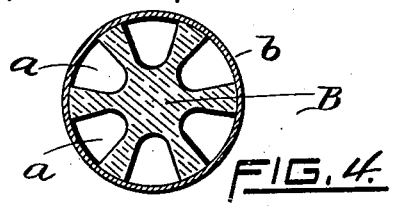
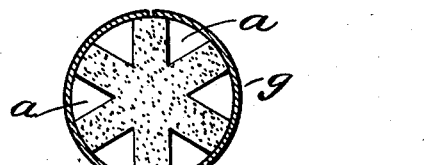
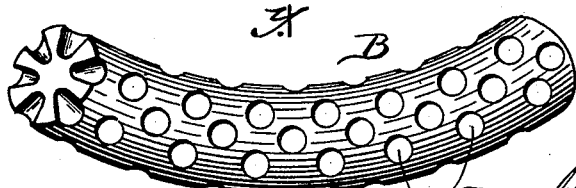
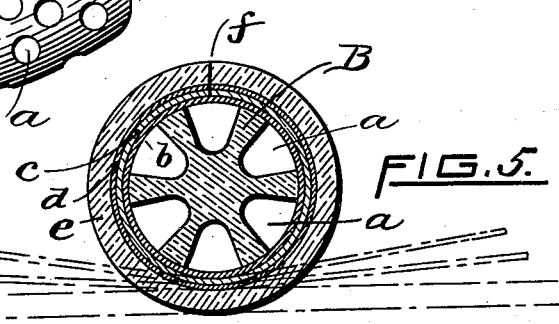
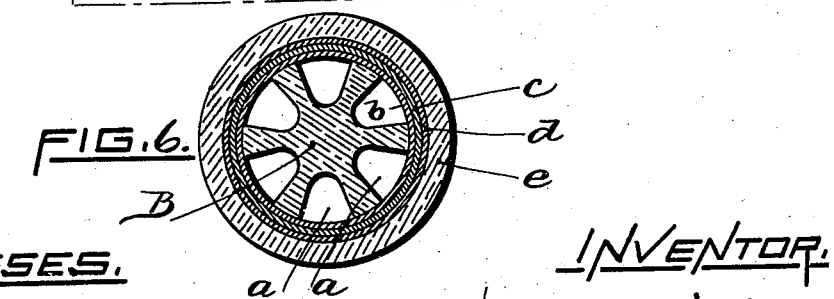
WITNESSES.
Wm. R. Fessenden
Abbott Gardner
INVENTOR.
Charles Hird.
By Charles T. Hannigan
Atty.
THE NORRIS PETERS CO., PHOTO-LITHO., WASHINGTON, D. C.

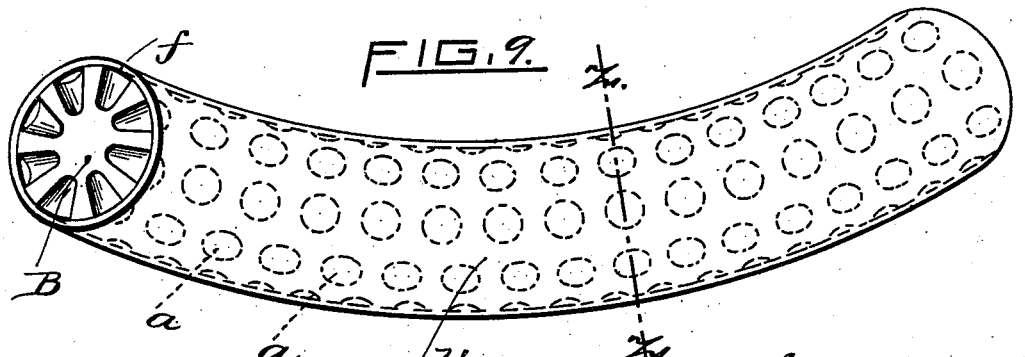
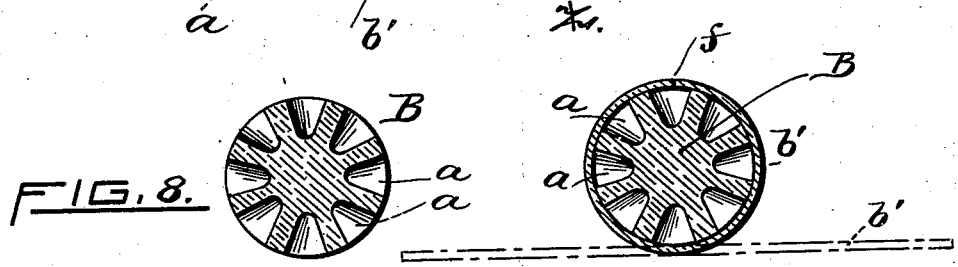
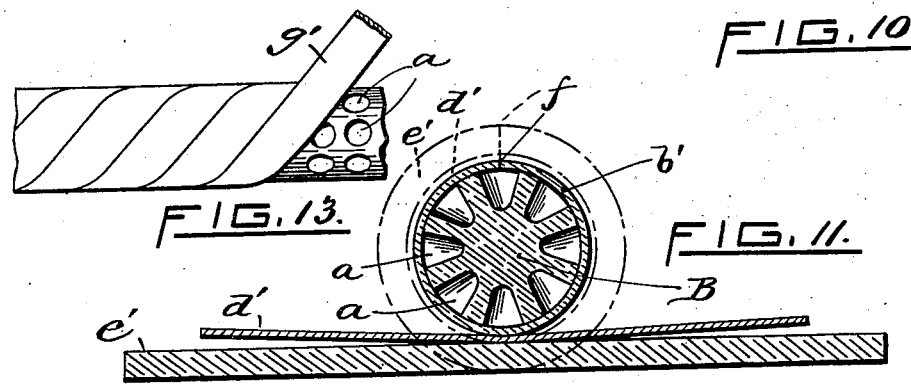
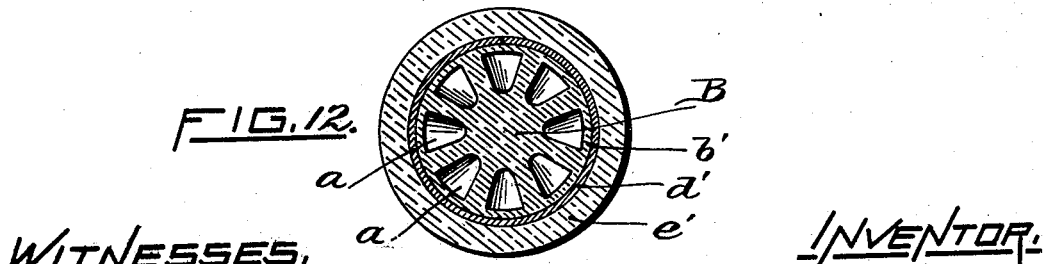

UNITED STATES PATENT OFFICE.

CHARLES HIRD, OF WOONSOCKET, RHODE ISLAND, ASSIGNOR OF FORTY-NINE ONE-HUNDREDTHS TO PATRICK J. McCARTHY, OF PROVIDENCE, RHODE ISLAND.

CUSHION-TIRE.

SPECIFICATION forming part of Letters Patent No. 690,287, dated December 31, 1901.

Application filed September 20, 1901. Serial No. 75,971. (No model.)

*To all whom it may concern:*

Be it known that I, CHARLES HIRD, a subject of the King of Great Britain, residing at the city of Woonsocket, in the county of Providence and State of Rhode Island, have invented certain new and useful Improvements in Cushion-Tires, of which the following is a specification.

My invention relates to the method of making the outer covering or casing for the cellular core of vehicle-tires; and it consists in sections of layers made of fabric and rubber, respectively, mounted upon the core and vulcanized thereto in the manner as hereinafter described, and specifically pointed out in the claims.

In the accompanying two sheets of drawings, Figure 1 represents a side elevation of the casing of a cellular tire. Fig. 2 is a perspective elevation view of one sectional length of a cellular core. Fig. 3 is one sectional length of a cellular core having a braid woven upon its circumferential surface. Fig. 4 is an enlarged cross-sectional view taken in line *x x* of Fig. 3. Fig. 5 is a cross-sectional view illustrating the different layers consisting of fabric and rubber, respectively, in dotted position and as folded over the braided covered core prior to vulcanizing the rubber parts.
Fig. 6 is a cross-sectional view of a finished tire, as seen in line *y y* of Fig. 1. Fig. 7 represents the cellular core as made from other yielding material than that of rubber and covered by a layer of cloth. Fig. 8 is a cross-sectional view of a rubber cellular core. Fig. 9 is a perspective elevation view of a sectional length of a rubber core inclosed by a thin sheet or layer of rubber extending from either end thereof. Fig. 10 is a cross-sectional view taken in line *z z* of Fig. 9 and showing the layer of rubber in dotted position as prior to folding upon the core. Fig. 11 illustrates two layers, each of fabric and rubber, respectively, as in position to be folded over the last-aforesaid covered core. Fig. 12 is a cross-sectional view of a completed tire as when the core is first covered by a layer of rubber. Fig. 13 is a partial elevation view of a cellular core as covered by tape and wound in a spiral form thereon.

Similar letters of reference indicate similar parts in the different views of the drawings.

The principle of my invention is to provide a shield or casing A for the cellular core of vehicle-tires, which core may be made of rubber or other suitable yielding material, and the method I employ to cover said core is as follows.

Referring to Fig. 2 of the drawings, B indicates one sectional length of a cellular core, which is of a circular form in cross-section and provided with any shape or number of cells *a a*. This core, of which a series of sectional lengths are cast to complete the circle of the tire, consists of rubber that is molded in a suitable flask, (not shown,) after which each sectional length of core is covered by braid *b*, (see Fig. 3,) which is woven upon the circumferential surface of the rubber in any suitable manner. When the core-sections are thus covered, each section of core is placed centrally upon and longitudinally of a series of layers or strips made of fabric and rubber, respectively, and these strips are placed one on top of the other and all extend the full length of the braided core, and said layers comprise an inner strip *c*, made of rubber, a middle strip *d*, made of fabric, and a strip of rubber *e* of such thickness as may be required for the exposed or outer part of the tire, and each of the said strips *c*, *d*, and *e* is of a width that when folded over upon the surface of the braided core the edges meet together, as at a point *f*. The core-sections thus covered are placed in a flask, and the end faces of the parts assembled together as described are coated with cement to adhere to each and all of the sections, after which the flask is covered and put in a heated press, (not shown,) which unites or vulcanizes the different parts of the rubber and makes the same continuous of each other throughout the entire circle of the tire in the manner as illustrated in cross-section in Fig. 6.

The core B may be cast in one continuous piece to form a circle of the tire instead of dividing it in sectional lengths, as described, in which case each of the aforesaid strips would be made of a length to extend the entire circle of the tire and vulcanized together, as described, without departing from the spirit of my invention.

This method of covering the core is also applicable to a cellular core made of cork or other yielding material than that of rubber, and, as represented in Fig. 7, such a core may, instead of being braided, as in Fig. 3, be inclosed by a layer of fabric, as $g$, or it may be covered by a band of tape $g'$, wound in a spiral form, as shown in Fig. 13. In either case the aforesaid outer strips $c$, $d$, and $e$ would be used to encircle the said parts $g$ and $g'$ and the rubber put through the process of vulcanizing, as hereinbefore described.

I do not wish to confine myself strictly to the manner of constructing a casing as specified for a rubber cellular core, for instead of braiding the core, as represented in Fig. 3, a strip of thin rubber $b'$ may be used to fold over the surface of the rubber core, as shown in Figs. 9 and 10, after which the core thus covered is placed centrally upon and longitudinally of two layers or strips consisting of fabric and rubber, as $d'$ and $e'$, respectively, as represented in cross-section in Fig. 11, and the said strips $d'$ and $e'$ are of the proper length and width to encircle the said covered core, and the parts thus assembled are vulcanized, making the rubber portions integral with each other, as shown in the complete cross-section of the tire in Fig. 12.

It will be readily understood that by this construction I form a very durable casing for the cellular core of vehicle-tires.

Having described my invention, what I claim as new, and desire to secure by Letters Patent, is—

1. In a vehicle-tire having a circular cellular core, made of rubber and cast in equal sectional lengths to form the circle of the tire, the combination therewith, of a casing consisting of a series of said sectional lengths of core, each core-section covered by braid woven upon its exterior surface, with three independent layers or strips forming one of a like series to encircle each of the aforesaid braided sections of core, and each of said strips made of rubber, fabric, and rubber, respectively, all of said parts adapted to be placed within a suitable flask and given the proper degree of heat whereby all of said rubber parts are united together and forming a continuous tire, substantially as set forth.

2. In a vehicle-tire having a circular cellular core, made of rubber and cast in equal sectional lengths to form the circle of the tire, the combination therewith, of a casing consisting of three independent layers or strips forming one of a like series to encircle each of the aforesaid sectional lengths of core, and each of said strips made of rubber, fabric, and rubber, respectively, so arranged that when placed in a suitable flask and given the proper degree of heat all of the rubber portions are made integral with each other throughout the circle of the tire, substantially as set forth.

3. In a vehicle-tire having a circular cellular core, made of yielding material and divided in equal sectional lengths to form the circle of the tire, the combination, of a casing consisting of a series of said sectional lengths of core, each core-section covered by a band of tape wound in a spiral form upon the exterior surface thereof, with three independent layers or strips, each made of rubber, fabric, and rubber, respectively, placed one on top of the other and forming one of a like series to encircle each of the said covered sections of core, all of said parts assembled together in a suitable flask and given the proper degree of heat to unite and make the aforesaid rubber strips continuous of each other throughout the circle of the tire, substantially as set forth.

In testimony whereof I affix my signature in presence of two witnesses.

CHARLES HIRD.

Witnesses:
WM. R. FESSENDEN,
C. ABBOTT GARDNER.